Feb. 28, 1956 — R. W. SCHARES — Re. 24,621 / 2,736,657
DISPENSING CONTAINER FOR SUPPORT UPON
AN EDGE OF A RECEPTACLE
Filed Dec. 30, 1952
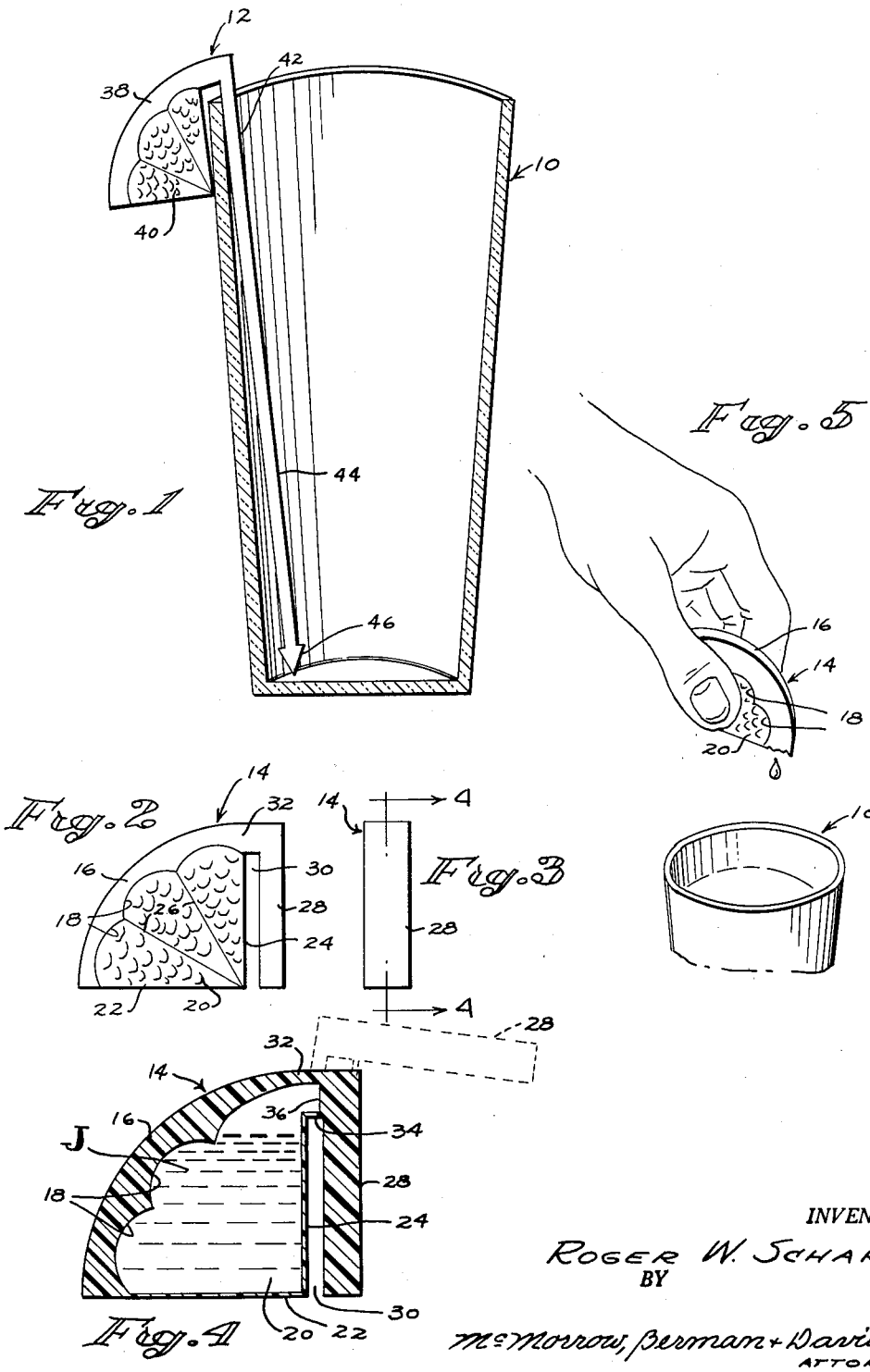
INVENTOR.
ROGER W. SCHARES
BY
McMorrow, Berman + Davidson
ATTORNEYS

United States Patent Office 2,736,657
Patented Feb. 28, 1956

2,736,657

DISPENSING CONTAINER FOR SUPPORT UPON AN EDGE OF A RECEPTACLE

Roger W. Schares, New Hampton, Iowa

Application December 30, 1952, Serial No. 328,585

3 Claims. (Cl. 99—171)

This invention relates to a device adapted to hold a quantity of juice, such as lemon, orange, or lime juice, or any other liquid, the article constituting the present invention being adapted, in one possible commercial embodiment thereof, to simulate a fruit slice and being adapted for dispensing of the juice or any other liquid contained therein.

It is one important object to provide a device of the type stated which can be substituted for the conventional slice of fresh lemon, orange, or lime used to flavor beverages and foods.

It is another important object to provide an artificial food slice adapted to contain a quantity of juice to be dispensed, said slice further including a mixer stick capable of being separated from the slice to permit dispensing of the juice and to facilitate stirring of a beverage.

Another object is to provide a dispensing device which can be used for the dispensing of any of various liquids, such as hand lotions, cosmetics, condiments, water purifiers such as chlorine, etc.

Another object of importance is to provide a juice dispensing device in the form of an artificial fruit slice, the slice having a slotted portion adapting the same for support upon the rim of a glass or equivalent container, the slotted portion providing means adapted to be broken off to form a dispensing opening through which the fruit juices may be expelled.

Yet another object is to provide a dispensing device in the form of an artificial slice of fruit, which device can be formed from plastic material or the like, a portion of the plastic material being compressible to effect the dispensing of the juice ordinarily sealed within the slice.

Other objects will appear from the following description, the claims appended thereto, and from the annexed drawing, in which like reference characters designate like parts throughout the several views, and wherein:

Figure 1 is a longitudinal sectional view through a beverage glass, showing in side elevation one form of the present invention, as it appears when mounted upon said glass;

Figure 2 is a side elevational view of a second form of the invention;

Figure 3 is an edge elevational view of the dispensing device shown in Figure 2, as it appears when viewed from the right of Figure 2;

Figure 4 is an enlarged sectional view taken substantially on line 4—4 of Figure 3, the dotted lines indicating a position to which a frangible portion of the device is moved preliminary to dispensing of the juices; and Figure 5 is a fragmentary perspective view showing the dispensing device as it appears when in use.

Referring to the drawings in detail, the reference numeral 10 has been applied generally to a beverage glass, in association with which the invention can be used. The reference numeral 12 has been applied generally to one form of dispensing device formed in accordance with the present invention, while the reference numeral 14 has been applied generally, in Figures 2 to 5 inclusive, to designate another form of the invention.

Considering the form of the invention shown in Figures 2 to 5 inclusive, the device can be molded in its entirety from plastic material or the like, said material being molded to an external configuration that will simulate closely the shape of a slice of lemon, orange, lime or other fruit from which juice can be squeezed. Additionally, it may be noted at this point that the plastic material of which the dispensing device would be formed, will, in commercial embodiments of the invention, be compounded of colored pigments, that will add to the faithfulness of the simulation. Thus, if the dispensing device is formed to simulate a slice of lime, the device would be green in color. Similarly, the device would be yellow if it is to simulate a slice of lemon, and orange, if it is to simulate a slice of orange.

In any event, the dispensing device constituting the present invention is relatively flat, and has an arcuate back piece 16, extending through substantially ninety degrees of a circle, thus to simulate a quarter slice of fruit.

The arcuate back piece 16 has an inner edge formed with a series of longitudinal depressions 18, said depressions 18 simulating the segments of the fruit slice.

Cemented or otherwise permanently attached to the inner edge of the back piece 16 is a flexible envelope 20, said envelope being formed of a relatively firm, deformable plastic material externally colored and grained to simulate the juice-bearing portion of the fruit slice. The envelope would be sufficiently pliable to permit juice to be squeezed readily therefrom. The envelope 20 has edges 22, 24 disposed at right angles to one another, the free end of the edge 22 abutting and secured to the adjacent one end of the back piece 16, with a free end of the edge 24 being inwardly of and spaced from the other end of the back piece 16. Exteriorly, the spaced portions of the segmentally shaped envelope may have radial lines 26 impressed therein, said lines simulating the divisions of the slice of fruit.

Contained within the deformable envelope is a supply of juice J. The juice J would be lemon juice, orange juice or lime juice, it being common practice in the art to sell said juices in concentrated or unconcentrated form, sealed in suitable containers.

The back piece 16 could be channeled or hollowed out so as to hold juice. This construction would, in fact, be preferred in commercial embodiments of the invention, I believe.

In filling the envelope, it would be possible to accomplish the envelope filling in any of various ways. For example, a small needle might be injected to insert the juice under pressure, after which the opening made by the needle could be fused shut. Alternatively, the envelope could be partially attached to the rigid back piece 16, with a portion of the envelope being left open. Thereafter, the envelope could be filled, and the open portion sealed to the back piece.

Arranged exteriorly of and in parallel spaced relation with respect to the edge 24 of the envelope 20 is an arm 28 of rigid material, one end of the arm 28 abutting and being secured to the other end 32 of the back piece 16. The space 30 between the arm 28 and the edge 24 of the envelope 20 is adapted to receive the rim of a beverage glass, thus to cause the artificial fruit slice to be supported upon the beverage glass in the usual manner presently practiced when real fruit juices are served with beverages. Projecting perpendicularly from the inner face of the arm 28 adjacent the one end secured to the other end of the back piece 16 is a frangible strip 34 which has its free end abutting and secured to the free end of the edge 24 of the envelope 20. The space 36 between the strip 34 and the other end 32 of the back piece 16 forms a dispensing opening when the frangible strip is broken away from the edge 24 of the envelope 20 and the arm 28 is swung from its parallel position with respect to the edge 24 of the envelope 20 to an extended position wholly away from such edge, as illustrated by the dotted lines in Figure 4.

In use of a dispensing device formed as shown in Figures 2 to 5, the artificial fruit slice would ordinarily be served upon the beverage glass. Subsequently, when it is desired to dispense the juice J, the arm 28 would be grasped, and pulled outwardly to the dotted line position shown in Figure 4. This would cause the arm 28 to break off from the back piece 16, exposing the dispensing opening 36. Thereafter, the slice is grasped in the manner shown in Figure 5, and the opposite sides of the envelope 20 are squeezed. This causes the juice to be dispensed through the opening, into the beverage glass.

Except for the relatively firm but pliable envelope, the entire device is made of a single piece of hard plastic material.

In Figure 1, there has been illustrated a modified form wherein the back piece 38 has an envelope 40 secured thereto, the back piece and envelope corresponding to the back piece and envelope of Figure 2.

Rigid with one end of the back piece 38 is an arm 42 analogous to the arm 28. However, in the form of the invention shown in Figure 1, the arm 42 has an elongated extension 44 provided at its free end with a point 46. The arm is thus fashioned as a mixing stick, which, after being broken off from the back piece 38, can be used in stirring a beverage.

The device, it is believed, has certain advantages over ordinary, fresh fruit slices. For example, the device is clean and sanitary, and furnishes accurate portion control. Additionally, the device permits elimination or substantial reduction of the amount of labor involved in cutting and preparing fresh fruit slices.

Still further, the device has an advantage so far as producers are concerned, since juice from windfall fruits can be used effectively, in the artificial fruit slices.

Although the invention has been illustrated and described as a simulated slice of fruit from which fruit juice can be dispensed, it could have other forms, the showing of a fruit slice being merely illustrative and not necessarily restrictive. Further, any liquid, whether it be fruit juice or some other liquid, can be dispensed therefrom.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A juice dispensing device comprising a rigid back piece, an envelope secured to said back piece, the back piece and envelope being formed to simulate a fruit slice, the envelope being formed of a deformable material to permit dispensing of a fruit juice contained therein responsive to squeezing of the envelope, an arm arranged exteriorly of and in parallel spaced relation with respect to one of the edges of said envelope and having one end rigidly secured to the adjacent end of said back piece, a space between said arm and edge of said envelope being adapted to receive the rim of a beverage glass, and a frangible strip projecting perpendicularly from the inner face of said arm and having its free end abutting and secured to said edge of said envelope, the space between said strip and the end of said back piece connected to said arm forming a dispensing opening when the frangible strip is broken away from said edge of said envelope and the arm has been swung away from its parallel position.

2. A juice dispensing device comprising a rigid back, an envelope facing said back, said back piece and envelope being formed to simulate a fruit slice, the envelope being formed of a deformable material to permit dispensing of a fruit juice contained therein responsive to squeezing of the envelope and having edges disposed at right angles with respect to each other with the free end of one of the edges abutting and secured to the adjacent one end of said back piece and with the free end of the other of the edges being inwardly of and spaced from the other end of the back piece, an arm arranged exteriorly of and in parallel spaced relation with respect to the other edge of said envelope and having one end rigidly secured to the other end of said back piece, a space between said arm and the other edge of said envelope being adapted to receive the rim of a beverage glass, and a frangible strip projecting perpendicularly from the inner face of said arm and having its free end abutting and secured to the free end of the other edge of said envelope, the space between said strip and the other end of said back piece forming a dispensing opening when the frangible strip is broken away from the other edge of said envelope and the arm has been swung away from its parallel position.

3. A juice dispensing device comprising a rigid back, an envelope facing said back, said back piece and envelope being formed to simulate a fruit slice, the envelope being formed of deformable material to permit dispensing of a fruit juice contained therein responsive to squeezing of the envelope and having edges disposed at right angles with respect to each other with the free end of one of the edges abutting and secured to the adjacent one end of said back piece and with the free end of the other of the edges being inwardly of and spaced from the other end of the back piece, an arm arranged exteriorly of and in parallel spaced relation with respect to the other edge of said envelope and having one end rigidly secured to the other end of said back piece, the space between said arm and the other edge of said envelope being adapted to receive the rim of a beverage glass, and a frangible strip projecting perpendicularly from the inner face of said arm and having its free end abutting and secured to the free end of the other edge of said envelope, the space between said strip and the other end of said back piece forming a dispensing opening when the frangible strip is broken away from the other edge of said envelope and the arm has been swung away from its parallel position, said arm including an elongated extension extendible into said beverage glass to provide a mixing stick.

References Cited in the file of this patent

UNITED STATES PATENTS

| | | |
|---|---|---|
| 634,349 | Humphrey | Oct. 3, 1899 |
| 2,103,389 | Salfisberg | Dec. 28, 1937 |
| 2,134,489 | Scherer | Oct. 25, 1938 |
| 2,597,468 | Garrett | May 20, 1952 |
| 2,606,836 | McCabe | Aug. 12, 1952 |

FOREIGN PATENTS

| | | |
|---|---|---|
| 11,830 of 1928 | Australia | Feb. 20, 1928 |